United States Patent [19]

Engel et al.

[11] Patent Number: 5,780,551
[45] Date of Patent: Jul. 14, 1998

US005780551A

[54] TELECHELIC POLYMERS FROM MIXED INITIATOR

[75] Inventors: John F. Engel, Belmont; James A. Schwindeman, Lincolnton, both of N.C.; Roderic P. Quirk, Akron, Ohio; Conrad W. Kamienski, Gastonia, N.C.

[73] Assignee: FMC Corporation, Philadelphia, Pa.

[21] Appl. No.: 657,084

[22] Filed: Jun. 3, 1996

Related U.S. Application Data

[60] Provisional application No. 60/006,154 Nov. 1, 1995.
[51] Int. Cl.[6] .................................................. C08F 297/04
[52] U.S. Cl. .......................... 525/236; 525/271; 525/250; 525/314; 525/316; 525/332.2; 525/331.9; 525/338; 526/178; 526/173; 526/335
[58] Field of Search ........................... 525/236, 316, 525/314, 271, 250, 332.2, 331.9, 338; 526/178, 173, 335

[56] References Cited

U.S. PATENT DOCUMENTS

| | | |
|---|---|---|
| 3,280,084 | 10/1966 | Zelinski et al. . |
| 3,326,881 | 6/1967 | Uraneck et al. . |
| 3,639,517 | 2/1972 | Kitchen et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 3,985,830 | 10/1976 | Fetters et al. . |
| 4,039,593 | 8/1977 | Kamienski et al. . |
| 4,994,526 | 2/1991 | Peters . |
| 5,310,490 | 5/1994 | Struglinski et al. . |
| 5,310,814 | 5/1994 | Struglinski et al. . |
| 5,331,058 | 7/1994 | Shepherd et al. . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |

FOREIGN PATENT DOCUMENTS

| | | |
|---|---|---|
| 0 593 049 | 4/1994 | European Pat. Off. . |
| 0 632 075 | 1/1995 | European Pat. Off. . |
| 2 241 239 | 8/1991 | United Kingdom . |
| 2 270 317 | 3/1994 | United Kingdom . |
| WO 91/12277 | 8/1991 | WIPO . |
| WO 95/22566 | 6/1995 | WIPO . |

OTHER PUBLICATIONS

D.N. Schulz et al., J. Poly. Sci. Polymer Chem. Ed. 12, 153–166 (1974).
M. Gardette et al., Tetrahedron 41, 5887–5899 (1985).
J. Almena, Tetrahedron 51, 11883–11890 (1995).
A.J. Dias et al., Rubber & Plastics News, pp. 18–20 (Oct. 31, 1988).
A.J. Dias et al., Macromolecules 20, 2068–2076 (1987).

*Primary Examiner*—Irina S. Zemel
*Attorney, Agent, or Firm*—Bell Seltzer Intellectual Property Law Group of Alston & Bird LLP

[57] ABSTRACT

This invention concerns novel, unsymmetrically protected, telechelically functionalized linear and star or multi-arm polymers, their optionally hydrogenated analogues, the polymers produced by selective removal of the protecting groups, the segmented block polymers produced by further reaction of these selectively deprotected polymers with selected comonomers, and the processes to prepare these polymers.

72 Claims, No Drawings

TELECHELIC POLYMERS FROM MIXED INITIATOR

CROSS-REFERENCE TO RELATED APPLICATIONS

This application is related to commonly owned copending provisional application Ser. No. 60/006,154, filed Nov. 1, 1995, and claims the benefit of its earlier filing date under 35 U.S.C. §119(e).

This invention concerns novel, unsymmetrically protected, telechelically functionalized linear and star or multi-arm polymers, their optionally hydrogenated analogues, the polymers produced by selective removal of the protecting groups, the segmented block polymers produced by further reaction of these selectively deprotected polymers with selected comonomers, and the processes to prepare these polymers.

BACKGROUND OF THE INVENTION

Telechelic, linear polymers possessing functional groupings on the chain ends are described in copending US patent applications 332217, 436784, 460300, 460301, and 436780. These polymers are prepared by polymerizing conjugated alkadienes or alkenylaromatic compounds or mixtures thereof with protected functional initiators of the formulas:

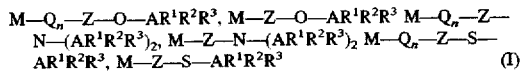

$$M-Q_n-Z-O-AR^1R^2R^3, M-Z-O-AR^1R^2R^3 \; M-Q_n-Z-N-(AR^1R^2R^3)_2, M-Z-N-(AR^1R^2R^3)_2 \; M-Q_n-Z-S-AR^1R^2R^3, M-Z-S-AR^1R^2R^3 \qquad (I)$$

wherein M is defined as an alkali metal, preferably lithium; Q is an unsaturated hydrocarbyl group derived by incorporation of a compound selected from the group consisting of one or more conjugated diene hydrocarbons, one or more alkenylaromatic compounds, or mixtures of one or more dienes with one or more alkenylaromatic compounds; Z is defined as a branched or straight chain hydrocarbon connecting group which contains 3–25 carbon atoms, optionally containing aryl or substituted aryl groups; (AR$^1$R$^2$R$^3$) is a protecting group, in which A is an element selected from Group IVa of the Periodic Table of the Elements as exemplified by carbon and silicon; R$^1$, R$^2$, and R$^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms, and n is an integer from 1 to 5, and reacting the resulting polymer anion with a functionalizing agent selected from the group of ethylene oxide, carbon dioxide, sulfur, 1,5-diazabicyclo(3.1.0)hexane, N-benzylidenetrimethylsilylamide, styrenyldimethylchlorosilane, and other materials known in the art to be useful for terminating or end-capping of polymers, and optionally hydrogenating and deprotecting the resultant telechelic polymer.

Linear telechelic polymers prepared with alkali metal (lithium) initiators possessing protected functional groups different from the above are described in U.S. Pat. Nos. 5,376,745, 5,391,637 and in Great Britain patent application 2,241,239. These all involve use of protected functional initiators of the formula

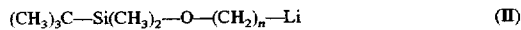

$$(CH_3)_3C-Si(CH_3)_2-O-(CH_2)_n-Li \qquad (II)$$

where n is an integer from 3 to 10 as initiators to polymerize conjugated dienes, followed by end-capping of the resultant polymer anions with ethylene oxide or other functionalizing agent and, finally, deprotection of the functional group at the other end of the polymer chain.

Multi-branched or star-shaped polymers prepared with organolithium initiators were first described by Zelinski in U.S. Pat. No. 3,280,084, in which polybutadiene anion (generated by addition of butyllithium to butadiene) was coupled with 0.02 to 1 part by weight of divinylbenzene to 100 parts of monomer. The resultant star polymer had a polydivinylbenzene core and several identical arms of polybutadiene radiating from the core. The arms could also be either random or block copolymers of styrene and butadiene, wherein the diene is the major component. The synthesis of star polymers with arms of different molecular weights was disclosed by Kitchen et al. U.S. Pat. No. 3,639,517. Fetters and Bi, U.S. Pat. No. 3,985,830, detail the preparation of star polymers with a nucleus of more than one molecule of divinyl benzene, and more than three arms. These polymers were formed by addition of living homopolymers and copolymers of conjugated diene monomers and block copolymers of conjugated diene monomers and monovinylaromatic monomers to divinylbenzene. These unfunctionalized star polymers have been employed as viscosity index (V.I.) improvers for lube oil compositions (see for example, U.S. Pat. Nos. 5,310,490 and 5,310,814).

Star polymers have also been prepared which contain functionality, such as hydroxy groups, at the ends of the arms. For instance, European Patent Application 0632075, disclosed the preparation of star molecules with hydroxyl groups formed at the terminus of each living arm of the star. These polymers were prepared by addition of ethylene oxide to the living anions at the ends of the arms of the star polymer. However, these functionalization reactions are often inefficient, due to the formation of physical gelation phenomena that produce severe mixing problems (see L. Weber, Makromol. Chem., Macromol. Symp., 3, 317 (1986) and U.S. Pat. Nos. 5,393,843 and 5,478,899). These functionalized star polymers were useful in making adhesives, sealants, coatings, films and fibers.

Neither the linear nor multi-arm functional polymers described above possess functional chain ends which are protected with more than one type of protecting group and thus, are not capable of being selectively deprotected and further selectively reacted with comonomers to produce the novel segmented block polymers of this invention.

DESCRIPTION OF THE INVENTION

This invention provides novel dissimilarly protected, telechelically functionalized linear and star or multi-arm polydiene, polyarylethylene and polydiene/polyarylethylene polymers, their hydrogenated analogues, the polymers produced by selective deprotection of the functional groups, the telechelic segmented block polymers produced by further reaction of the selectively deprotected polymers with various comonomers, and the processes to prepare these polymers.

One aspect of this invention provides a process for the preparation of novel linear and multi-arm polymers possessing dissimilarly protected telechelic functionalities comprising polymerizing, one or more conjugated dienes or one or more alkenylaromatic compounds or mixtures thereof, in a liquid reaction medium, at a temperature of −30° C. to 150° C., for a period of at least one hour, with at least two protected functionalized initiators, each of which contains a differently protected hydroxyl, amino, alkylamino, or sulfhydryl group, having the formula

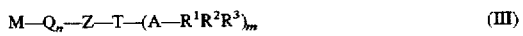

$$M-Q_n-Z-T-(A-R^1R^2R^3)_m \qquad (III)$$

wherein M is Li, Q is an unsaturated hydrocarbyl group derived by incorporation of one or more conjugated diene hydrocarbons, one or more polymerizable alkenylaromatic compounds, or mixtures of one or more dienes with one or more polymerizable alkenylaromatic compounds into the M—Z linkage, Z is a branched or straight chain hydrocarbon connecting group which contains 3–25 carbon atoms; T is oxygen, sulfur, or nitrogen; $A(R^1R^2R^3)_m$ is a protecting group, in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms, n is an integer from 0 to 5, and m is 1 when T is oxygen or sulfur, and 2 when T is nitrogen, to produce "living" polymer anions which are reacted with difunctional or polyfunctional linking agents to produce dissimilarly protected telechelically functionalized linear or multi-arm polymers, and optionally hydrogenating the resulting polymers.

Another aspect of this invention describes a process for the preparation of novel linear and multi-arm polymers possessing one free telechelically functional group and at least one protected telechelically functional group from the above linear and multi-arm polymers possessing dissimilarly protected telechelic functionalities which comprises selectively deprotecting one type of dissimilarly protected functionality on the end(s) of the arms of the linear or multi-arm polymer chains using selective reagents specifically suited to remove the targeted protective group, —A—$R^1R^2R^3$, and liberate the desired functionality, —T—$H_m$ on the end(s) of the polymer chains.

Still another aspect of this invention involves the preparation of novel telechelic segmented block polymers by the process consisting of the following steps, which include the preparation of the polymers of aspects one and two of this invention, as stated above, comprising (a) polymerizing one or more conjugated dienes or one or more polymerizable alkenyl-substituted aromatic hydrocarbon or a mixture or mixtures thereof using two or more functionalized initiators, each of which contains a differently protected hydroxyl, amino, alkylamino, or sulfhydryl group, having the following formula:

$$M—Q_n—Z—T—(A—R^1R^2R^3)_m \qquad (III)$$

where M is an alkali metal, preferably lithium, Q is an unsaturated hydrocarbyl group derived by incorporation of a compound selected from the group consisting of one or more conjugated diene hydrocarbons, one or more alkenylaromatic compounds, or mixtures of one or more dienes with one or more alkenylaromatic compounds into the M—Z linkage, Z is defined as a branched or straight chain hydrocarbyl connecting group containing 3 to 25 carbon atoms; T is an element selected from the group of oxygen, sulfur, and nitrogen; $(AR^1R^2R^3)_m$ is a protecting group, in which A is an element selected from Group IVa of the Periodic Table of the Elements as exemplified by carbon and silicon; $R^1$, $R^2$, and $R^3$ independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; m is 1 when T is oxygen or sulfur and 2 when T is nitrogen, and n is an integer from 0 to 5, to produce two or more types of linear polymer chains possessing terminal carbon-lithium functionalities, (hereinafter termed "polymer anions") and each polymer chain type possessing a dissimilarly protected functional group at the other end of the polymer chain.

(b) Linking a mixture of the resulting dissimilarly protected, telechelically functionalized polymer anions with compounds selected from the group of dihalosilanes, polyhalosilanes, stannanes, dihaloalkylsilanes, polyhaloalkylsilanes and isomeric divinylbenzenes and diisopropenylbenzenes, to produce a linear or multi-arm (star) polymer possessing dissimilarly protected functionalities on the ends of the arms of the linear or multi-arm polymer.

(c) optionally hydrogenating the resulting linear or multi-arm polymer (d) selectively deprotecting one type of dissimilarly protected functionality on the end(s) of the arms of the linear or multi-arm polymer chains using selective reagents specifically suited to remove the targeted protective group, —A—$R^1R^2R^3$, and liberate the desired functionality, —T—$H_m$ on the end(s) of the polymer chains.

(e) further reacting the deprotected functionality, —T—$H_m$, on the chain ends of the polymer with selected di- or polyfunctional comonomers, reactive to the deprotected functionality, selected from the group of (i) organic di- or polycarboxylic acids, (ii) organic di- or polyisocyanates, (iii) organic di- or polyamides and cyclic amides, (iv) organic di- or polyols, (v) ethylene oxide in the presence of potassium t-butoxide and (vi) methacryloyl chloride or styrenyldimethylchlorosilane followed by reaction in a subsequent step with a free-radically polymerizable monomer, such as styrene or methyl methacrylate, to produce a segmented or block copolymer (f) repeating the deprotection step on the other type(s) of dissimilarly protected functionality(s) on the remaining end(s) of the polymer chains using reagents specific to the deprotection step, and (g) further reacting the deprotected functionality(s), —$T^1$—$H_m$ with selected di- or -polyfunctional comonomers as described in (e) above to produce a copolymer possessing further segments or blocks.

Protected functional initiators of the formula M—Z—T—$(A—R^1R^2R^3)_m$, (IV) (M is preferably lithium=Li) which general formula represents the compound types shown above in background of invention and as M—Z—O—$CR^1R^2R^3$, M—Z—O—$SiR^1R^2R^3$, M—Z—N—$(CR^1R^2R^3)_2$, M—Z—N—$(SiR^1 R^2R^3)_2$, M—Z—S—$CR^1R^2R^3$, and M—Z—S—$SiR^1R^2R^3$ (formulas (I) and (II) above) are prepared by reacting their respective organic halides, Cl—Z—T—$(A—R^1R^2R^3)_m$ (V), with lithium metal in an inert, hydrocarbon solvent medium at reaction temperatures up to the reflux temperature of the solvent.

Incorporation of Q groups into the M—Z linkage to form the compounds of formula (III) above involves addition of compounds of the formula

$$M—Z—T—(A—R^1R^2R^3), \qquad (IV)$$

where the symbols have the meanings ascribed above, across the carbon to carbon double bonds in compounds selected from the consisting of one or more conjugated diene hydrocarbons, one or more alkenylaromatic compounds, or mixtures of one or more dienes with one or more alkenylaromatic compounds to produce new carbon-lithium bonds of an allylic or benzylic nature, much like those found in a propagating polyalkadiene or polyarylethylene polymer chain derived by anionic initiation of the polymerization of conjugated dienes or arylethylenes. These new carbon-lithium bonds are now "activated" toward polymerization and so are much more efficient in promoting polymerization than the precursor M—Z (M=Li) bonds, themselves.

Thus, the initiators of the formula M—$Q_n$Z—T—(A—$R^1R^2R^3$)$_m$ (III) are prepared by reacting a compound of the formula M—Z—T—(A—$R^1R^2R^3$)$_m$ (IV), wherein M, Z, T, A, $R^1$, $R^2$, $R^3$, and m have the meanings ascribed above, with one or more conjugated diene hydrocarbons, one or more alkenylaromatic compounds, or mixtures of one or more dienes with one or more alkenylaromatic compounds, to form an extended hydrocarbon chain between M and Z in formula (IV), which extended chain is denoted as $Q_n$ in formula (III) where n is an integer between 1 and 5. The compounds of formula (IV) are prepared by first, reacting in an inert solvent, a selected tertiary amino-1-haloalkane or an omega-hydroxy-protected-1-haloalkane or an omega-thio-protected-1-haloalkane, depending on whether "T" is to be N, O or S, (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional lithium initiator (of formula II) which is then optionally reacted with one or more conjugated diene hydrocarbons, one or more alkenylaromatic compounds, or mixtures of one or more dienes with one or more alkenylaromatic compounds, in a predominantly alkane or cycloalkane reaction solvent, which solvent contains 5 to 10 carbon atoms, and mixtures of such solvents to produce a monofunctional initiator with an extended hydrocarbon chain or tether —$Q_n$—Z— between the metal atom (M) and element (T) in formula (III) above and mixtures thereof with compounds of Formula (IV). Q in formula (III) is preferably derived from conjugated 1,3-dienes. While "A" in the protecting group (A$R^1R^2R^3$) of the formulae above can be any of the elements in Group IVa of the Periodic Table of the Elements, carbon and silicon initially appear the most useful, especially when polymerizing conjugated dienes.

The tertiary amino-1-haloalkanes useful in practicing this invention are compounds of the following general structures:

X—Z—N(A($R^1R^2R^3$))$_2$   (VI)

and (VII)

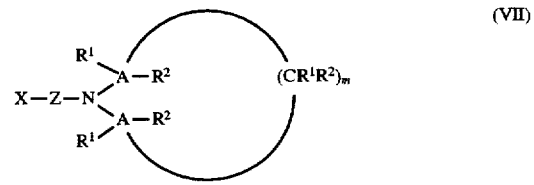

wherein X is defined as a halogen, preferably chlorine or bromine; Z is defined as a branched or straight chain hydrocarbon tether or connecting group which contains 3–25 carbon atoms, which tether may also contain aryl or substituted aryl groups; (A$R^1R^2R^3$)$_2$ is a protecting group, in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms; and m is an integer from 1 to 7. The process reacts selected tertiary amino-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Tertiary amino-1-haloalkanes useful in the practice of this invention include but are not limited to 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group is selected from chlorine and bromine.

Omega-hydroxy-protected-1-haloalkanes, useful in producing monofunctional ether initiators useful in practicing this invention, have the following general structure:

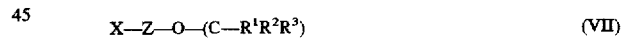

X—Z—O—(C—$R^1R^2R^3$)   (VII)

wherein X is defined as a halogen, preferably chlorine or bromine; Z is a branched or straight chain hydrocarbon group which contains 3–25 carbon atoms, optionally containing aryl or substituted aryl groups; (C$R^1R^2R^3$) is a protecting group, in which $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

The precursor omega-protected-1-haloalkanes (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involved the reaction of the appropriate alcohol with 2-methyl-2-butene catalyzed by boron trifluoride etherate is employed for the preparation of the t-amyl ethers. The alkoxy, alkylthio or dialkylamino substituted ethers, for example 6-[3-(methylthio)-1-propyloxy]-1-chlorohexane, were synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenyl methyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes prepared in accord with this earlier process useful in practicing this invention can include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-dimethyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino)-1-ethoxy]-1-propyl halide, 3-[2-(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is selected from chlorine and bromine.

U.S. Pat. No. 5,362,699 discloses a process for the preparation of hydrocarbon solutions of monofunctional ether initiators derived from omega-hydroxy-silyl-protected-1-haloalkanes of the following general structure:

$$X-Z-O-(Si-R^1R^2R^3) \qquad (IX)$$

wherein X is defined as a halogen, preferably chlorine or bromine; Z is a branched or straight chain hydrocarbon group which contains 3–25 carbon atoms, optionally containing aryl or substituted aryl groups; $(SiR^1R^2R^3)$ is a protecting group, in which $R^1$, $R^2$, and $R^3$ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25° C. and about 40°C., in an alkane, cycloalkane, or aromatic reaction solvent containing 5 to 10 carbon atoms and mixtures of such solvents.

Omega-silyloxy-1-haloalkanes prepared in accord with this earlier process useful in practicing this invention can include, but are not limited to, 3-(t-butyldimethylsilyloxy)-1-propyl halide, 3-(t-butyldimethyl-silyloxy)-2-methyl-1-propyl halide, 3-(t-butyidimethylsilyloxy)-2,2-dimethyl-1-propyl halide, 4-(t-butyidimethylsilyloxy)-1-butyl halide, 5-(t-butyidimethyl-silyloxy)-1-pentyl halide, 6-(t-butyidimethylsilyloxy)-1-hexyl halide, 8-(t-butyidimethylsilyloxy)-1-octyl halide, 3-(t-butyidiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 4-(t-butyldiphenylylsilyloxy)-1-butyl halide, 6-(t-butyldiphenylsilyloxy)-1-hexyl halide and 3-(trimethylsilyloxy)-2,2-dimethyl-1-propyl halide. The halo- or halide group is selected from chlorine and bromine.

Monofunctional thioether initiators useful in the practice of this invention are derived from omega-thio-protected-1-haloalkanes of the following general structure:

$$X-Z-S-(A-R^1R^2R^3) \qquad (X)$$

wherein X is defined as a halogen, preferably chlorine or bromine; Z is a branched or straight chain hydrocarbon group which contains 3–25 carbon atoms, optionally containing aryl or substituted aryl groups; $(AR^1R^2R^3)$ is a protecting group, in which A is an element selected from Group IVa of the Periodic Table of the Elements, and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms. The process reacts selected omega-thioprotected-1-haloalkyls whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

The initiator precursor, omega-thio-protected-1-haloalkanes (halides), are prepared from the corresponding halothiol by the standard literature methods. For example, 3-(1,1-dimethylethylthio)-1-propylchloride is synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involved the reaction of the appropriate thiol with 2-methyl-2-butene catalyzed by boron trifluoride etherate is employed for the preparation of the t-amyl ethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org. Chem., 58, 1993, 6470. Methoxymethylthio compounds, such as 6-(methoxymethylthio)-1-hexylchloride, are prepared by the reaction of the omega-chloro-thiol with bromochloromethane, methanol, and potassium hydroxide, by the method of F. D. Toste and I. W. J. Still, Synlett, 1995, 159. t-Butyldimethylsilyl protected compounds, for example 4-(t-butyldimethylsilylthio)-1-butylhalide, are prepared from t-butyldimethylchlorosilane, and the corresponding thiol, according to the method described in U.S. Pat. No. 5,493,044.

Omega-thio-protected 1-haloalkanes prepared in accord with this earlier process useful in practicing this invention can include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is selected from chlorine and bromine.

Thus, the protected functional organolithium initiators whose preparations are described above comprise the group of omega-(tert-alkoxy)-1-alkyllithiums, omega-(tert-alkoxy)-1-alkyllithiums chain extended with conjugated alkadienes or alkenyl aromatic compounds, omega-(tert-alkylthio)-1-alkyllithiums, omega-(tert-alkylthio)-1-alkyllithiums chain extended with conjugated alkadienes or alkenyl aromatic compounds, omega-(tert-butyidimethylsilyloxy)-1-alkyllithiums, omega-(tert-butyldimethylsilylthio)-1-alkyllithiums omega-(dialkylamino)-1-alkyllithiums, omega-(dialkylamino)-1-alkyllithiums chain-extended with conjugated alkadienes or alkenyl aromatic compounds, and omega-(bis-tert-alkylsilylamino)-1-alkyllithiums.

Examples of protected functionalized intiators that may be employed in this invention include, but are not limited to: 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyidimethylsilyloxy)-1-pentyllithium, 6-(t-butyldimethylsilyloxy)-1-hexyllithium, 8-(t-butyidimethylsilyloxy)-1-octyllithium and 3-(trimethylsilyloxy)-2,2-dimethyl-1-propyllithium 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 3-(hexamethyleneimino)-2-methyl-1-propyllithium, 3-(hexamethyleneimino)-2,2-dimethyl-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, and 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1- dimethylpropylthio)-1-pentyllithium, 6-(1,1-dimethylpropylthio)-1-hexyllithium, and 8-(1,1-dimethylpropylthio)-1-octyllithium. Of course, any of these initiators can be "chain extended" to increase hydrocarbon solubility prior to the polymerization reaction. In the chain extension process, the initiator is reacted with a limited amount (1–5 equivalents) of various conjugated diene hydrocarbons, such as butadiene or isoprene, or alkenyl substituted aromatics, such as styrene or alpha-methylstyrene.

One aspect of this invention describes the process of preparing novel linear and multi-arm polymers possessing dissimillarly protected telechelic functionalities by the process comprising polymerizing, one or more conjugated dienes or one or more alkenylaromatic compounds or mixtures thereof, in a liquid reaction medium, at a temperature of –30° C. to 150° C., for a period of at least one hour, with at least two protected functionalized initiators, each of which contains a differently protected hydroxyl, amino, alkylamino, or sulfhydryl group, having the formula

(III)

wherein M is Li, Q is an unsaturated hydrocarbyl group derived by incorporation of one or more conjugated diene hydrocarbons, one or more alkenylaromatic compounds, or mixtures of one or more dienes with one or more alkenylaromatic compounds into the M—Z linkage, Z is a branched or straight chain hydrocarbon connecting group which contains 3–25 carbon atoms; T is oxygen, sulfur, or nitrogen; $(AR^1R^2R^3)_m$ is a protecting group, in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; n is an integer from 0 to 5; and m is 1 when T is oxygen or sulfur, and 2 when T is nitrogen, to produce "living" polymer anions which are reacted with di- and polyfunctional linking agents to produce dissimilarly protected telechelically functionalized linear or multi-arm polymers, and optionally hydrogenating the resulting polymers.

Variations of the above process to prepare the novel unsymmetrically protected telechelically functionalized linear and multi-arm or star polymers of this invention can be carried out to allow differences in the resulting polymers, as follows:

(a) Polymerization of monomers can be carried out in the presence of two or more protected functional initiators, i.e., in the same reaction vessel, prior to linking the polmer anions. This leads to polymer anion chain lengths of approximately the same size, which, if linked with a multi-functional linking agent, such as, e.g., tetrachlorosilane, would result in a multi-arm polymer with like-sized arms, more closely resembling a star.

(b) Polymerization of monomers can be carried out separately, i.e., with each protected functional initiator in a separate vessel, prior to linking. This would allow for different polymer anion chain lengths to be produced in each vessel. If a multi-functional linking agent is now added to a mixture of the polymer anions produced above, a multi-arm polymer having differently sized arms would be formed.

(c) Also, different monomers or mixtures of monomers can be separately polymerized, either randomly or sequentially, with each protected functional initiator in process (b) above, leading to a wide variety of useful polymers of both the linear and multi-arm type (depending on the type of linking agent employed).

Anionic polymerizations employing the protected functional initiators whose preparations are described above are conducted in an inert solvent, preferably a non-polar solvent, optionally containing an ethereal modifier, using an olefinic monomer which is an alkenylaromatic or a 1,3-diene at a temperature of about –30° C. to about +150° C. The polymerization reaction proceeds from initiation to propagation and is finally terminated with appropriate reagents. The polymers may have a molecular weight range of about 1000 to 100,000 but the molecular weight can be higher. Typically 0.5 to 50 milli-moles of initiator is used per mole of monomer.

The ratio of any two (or more) of the protected functional initiators used in the practice of the invention can be varied widely, but practically should be in the range of about 1:1 to 20:1.

Examples of conjugated diene hydrocarbon monomers which can be polymerized with the protected functional initiators include, but are not limited to: 1,3-butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Examples of polymerizable alkenyl substituted aromatic compounds which can be anionically polymerized with the protected functional initiators include, but are not limited to: styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphathalene, 1,2-diphenyl-4-methylhexene-1 and mixtures of these, as well as alkyl, cycloalkyl, aryl, alkaryl and aralkyl derivatives thereof in which the total number of carbon atoms in the combined hydrocarbon constituents is generally not greater than 18. Examples of these latter compounds include; 3,5-dimethylstyrene, 3,5-diethylstyrene, 4-(t-butyl)-styrene, 2-ethyl-4-benzylstyrene, 4-phenylstyrene, 4-p-tolylstyrene, 2,4-divinyltoluene and 4,5-dimethyl-1-vinylnaphthalene. Reference is made to U.S. Pat. No. 3,377,404 for disclosures of additional alkenyl substituted aromatic compounds.

As stated above, the dienes may be polymerised alone, or in admixture with each other or with alkenyl aromatic compounds to form random copolymers, or by charging the dienes to the reaction mixture sequentially, either with each other or with alkenyl aromatic compounds, to form block copolymers.

The reaction temperature during polymerization is recommended to be in the range of –30° C. up to about +150° C., but may be even higher at elevated pressures.

The inert solvent employed during the polymerizations is preferably a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include but are not limited to inert liquid alkanes, cycloalkanes and aromatic solvents such as alkanes and cycloalkanes containing five to ten carbon atoms such as pentane, hexane, cyclohexane, methylcyclohexane, heptane, methylcycloheptane, octane, decane and so forth and aromatic solvents containing six to ten carbon atoms such as benzene, toluene, ethylbenzene, p-xylene, m-xylene, o-xylene, n-propylbenzene, isopropylbenzene, n-butylbenzene, and the like.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to: diethyl ether, dibutyl ether, tetrahydrofuran, 2-methyltetrahydrofuran, methyl tert-butyl ether, 1,2-dimethoxyethane (glyme), 1,2-diethoxyethane, diazabicyclo |2.2.2|octane, triethylamine, tributylamine, N-methylpiperidine, N-methylpyrrolidine, and N,N,N',N'-tetramethylethylene diamine (TMEDA). The amount of the polar modifier added depends on the vinyl content desired, the nature of the monomer, the temperature of the polymerization, and the identity of the polar modifier. The polar solvent (modifier) can be added to the reaction medium at the beginning of the polymerization as part of the solvent reaction medium or added during the polymerization.

Examples of linking or coupling agents recommended to link the polymer anions produced in the polymerizations initiated by the protected functional initiators are di-, tri- and tetrahalosilanes, polyhalodisilanes, di- and tri-haloalkylsilanes, polyhaloalkyldisilanes, di-, tri-, and tetrahalostannanes, di- and tri-haloalkylstannanes, 1,2-divinylbenzene, 1,3-divinylbenzene, 1,4-divinylbenzene, 1,2,4-trivinylbenzene, 1,3-divinylnaphthalene, 1,8-divinylnaphthalene, 1,2-diisopropenylbenzene, 1,3-diisopropenylbenzene, 1,4-diisopropenylbenzene, 1,3,5-trivinylnaphthalene, and other materials known in the art to be useful for coupling of polymers. See for example, U.S. Pat. No. 5,489,649 for additional coupling agents. Of course, mixtures of the coupling agents may also be employed. The amount of coupling agent added is such that the molar ratio of protected living polymer anions to coupling agent is in the range of 1 to 24.

Molecular weights of the resulting linked polymers may vary widely, depending on the molecular weight of the polymer anion and the number of potential functional linking groups on coupling agent. Thus, for example, when the polymer anion molecular weight of is 1000 and using the coupling agent methyltrichlorosilane a maximum molecular weight for the linked tri-branched polymer anion is 3000. On the other hand, when the molecular weight of the polymer arm is 40,000 and using divinylbenzene at a molar ratio of 3:1 based on the polymer anion, the resultant coupled molecular weight is 240,000 and the polymer has 6 branches. The coupled polymers may even be only double the molecular weight of the polymer anion when the linking agent is dimethyldichlorosilane, in which case the linked polymer is linear. The size of the branches in a linked polymer need not be the same as described under (b) and (c) above. Thus, the polymer linked with a tri- or higher functional linking agent may not necessarily be star shaped in appearance.

In a typical example of the above process, a hydrogenated hydroxy-terminated polybutadiene polymer containing t-butyldimethylsilyl protecting group(s) on some chain ends and t-butyl protecting group(s) at the other chain ends is produced by coupling a polymer anion generated by polymerizing butadiene with the protected functional initiator, 3-(t-buyldimethylsilyloxy)-1-propyllithium with a polymer anion generated by polymerizing butadiene with the protected functional initiator, 3-(1,1-dimethylethoxy)-1-propyllithium, using, e.g., either dimethyldichlorosilane to produce a linear polymer, or tetrachlorosilane to produce a multi-arm polymer and hydrogenating the resulting coupled polymer.

Examples of methods to hydrogenate the polymers of this invention are described in U.S. Pat. Nos. 4,970,254, 5,166,277, 5,393,843 and 5,496,898. The hydrogenation of the functionalized polymer is conducted in situ, or in a suitable solvent, such as hexane, cyclohexane or heptane. This solution is contacted with hydrogen gas in the presence of a catalyst, preferably a mixture of nickel octoate( 2-ethylhexanoate) and triethylaluminum. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nucleur Magnetic Resonance (NMR) spectroscopy. The hydrogenation reaction is conducted until at least 90% of the aliphatic unsaturation has been saturated. Preferably, at least 95% of the unsaturation has been saturated and, most preferably 98% of the unsaturation has been saturated. The hydrogenated functional polymer is then recovered by conventional procedures, such as removal of the catalyst with aqueous acid wash, followed by solvent removal or precipitation of the polymer employing known techniques.

Thus, excellent control of polymer chain chemistry and physical properties can be exerted in the novel process described above.

Another part of this invention describes a process for the preparation of linear and multi-arm polymers possessing one free telechelically functional group and at least one protected telechelically functional group which comprises selectively deprotecting one type of dissimilarly protected functionality on the end(s) of the arms of the linear or multi-arm polymer chains, produced as described above, using selective reagents specifically suited to remove the targeted protective group, —A—$R^1R^2R^3$, and liberate the desired functionality, —T—$H_m$ on the end(s) of the polymer chains.

The following table details experimental conditions that will selectively remove one of the protecting groups (more labile) from the polymer, while retaining the other protecting group (more stable).

| LABILE | STABLE | CONDITIONS |
| --- | --- | --- |
| t-Butyldimethylsilyl | t-Butyl | Tetrabutylammonium fluoride |
| t-Butyldimethylsilyl | t-Butyl | 1 N HCl |
| t-Butyldimethylsilyl | Dialkylamino | Tetrabutylammonium fluoride |
| t-Butyldimethylsilyl | Dialkylamino | 1 N HCl |
| t-Butyl | Dialkylamino | Amberlyst ® resin |
| t-Amyl | Dialkylamino | Amberlyst ® resin |
| Trimethylsilyl | t-Butyl | Tetrabutylammonium fluoride |
| Trimethylsilyl | t-Butyl | 1 N HCl |
| Trimethylsilyl | Dialkylamino | Tetrabutylammonium fluoride |
| Trimethylsilyl | Dialkylamino | 1 N HCl |

If desired, the protecting groups can be selectively removed from the polymer in the presence of each other either prior to or after the optional hydrogenation of the residual aliphatic unsaturation. For example, tert-butyldimethylsilyl protecting groups can be removed by treatment of a multi-arm polymer with acid, such as hydrochloric acid, acetic acid, p-toluenesulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83. To remove tert-alkyl-protected groups, the protected polymer is mixed with Amberlyst® 15 ion exchange resin and heated at an elevated temperature, for example 150° C., until deprotection is complete. In addition, tert-alkyl-protected groups can also be removed to varying extents by reaction of the multi-arm polymer with trifluoroacetic acid, acetic anhydride and ferric chloride, para-toluenesulphonic acid or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41. However, when both kinds of protective groups are present in a polymer one must exert care not to use a reagent for the removal of t-butyldimethylsilyl groups which is also strong enough to remove t-butyl groups, such as, e.g., para-toluenesulphonic acid. A better choice to remove t-butyldimethylsilyl protective groups in the presence of t-butyl protective groups would be 1N HCl, or tetrabutylammonium fluoride, as shown in the above table. para-Toluenesulfonic acid, on the other hand, would be a poor choice as it removes both groups.

Another part of this invention deals with the preparation of novel telechelic segmented block polymers which can be prepared in a number of ways from the polymers described above. For example, after the polymerization and linking reaction involving two or more polymer anions (containing different protective groupings on the same or different functionalities) followed by hydrogenation of the linked polymer, one of the protecting groups is selectively removed, while the remaining protecting group is retained. For instance, a t-butyldimethylsilyl protecting group can be selectively removed from a linear, t-butyldimethylsilyloxy-1,1-dimethylethoxy-terminated hydrogenated polybutadiene polymer (i.e., a hydrogenated hydroxy-terminated polybutadiene polymer containing t-butyldimethylsilyl protecting group(s) on some chain ends and t-butyl protecting group(s) at the other chain ends (produced by coupling a polmer anion generated by polymerizing butadiene with the protected functional initiator, 3-(t-buyldimethylsilyloxy)-1-propyllithium with a polymer anion generated by polymerizing butadiene with the protected functional initiator, 3-(1,1-dimethylethoxy)-1-propyllithium, using, e.g., either dimethyldichlorosilane to produce a linear polymer, or tetrachlorosilane to produce a multi-arm polymer and hydrogenating the resulting coupled polymer) using tetrabutylammonium fluoride. The newly liberated hydroxy-functional group at one polymer chain end is now caused to participate in various copolymerization reactions with a variety of comonomers susceptible to reaction with hydroxyl groups, such as, e.g., organic diacids and diisocyanates. After copolymerization is complete, the remaining 1,1-dimethylethoxy protecting group on the other end of the chain is removed using an acidic Amberlyst® resin and then further copolymerization chemistry can be performed on this newly liberated hydroxy-functional group using the same or different comonomers. Linear or multi-arm segmented or block polymers with various useful tailor-made properties can thus be prepared in this way because of the controlled nature of the process.

In a further example, the freed hydroxyl functionality in the 1,1-dimethylethyl (t-butyl) protected polymer above may be reacted with bisphenol A and phosgene in the presence of an appropriate basic catalyst to yield a polycarbonate-polybutadiene block copolymer. Further selective deprotection to remove the second protective group (viz., t-butyl) followed by reaction with a different quantity of bisphenol A and phosgene yields a polycarbonate-polybutadiene triblock copolymer with varying polycarbonate segments. The resulting products are useful as molding resins, for example, to prepare interior components for automobiles.

Other examples are described below:

A segmented polyamide-hydrogenated polybutadiene block copolymer is also useful as a molding composition to prepare exterior automotive components that can be prepared by reacting the selectively deprotected hydrogenated hydroxyterminated polybutadiene polymer above with caprolactam and adipic acid in the presence of a suitable catalyst in two separate steps.

A segmented polyamide-polyester-hydrogenated polybutadiene triblock copolymer is produced by reaction of a selectively deprotected hydrogenated hydroxyterminated polybutadiene polymer above with dimethyl terephthalate and a suitable acidic catalyst followed by further selective deprotection and reaction with caprolactam and adipic acid. Again, the products are useful as molding compounds for exterior automotive components.

Isocyanate-terminated prepolymers can be produced from selectively deprotected hydrogenated hydroxyterminated polybutadiene polymers by reaction with suitable diisocyanates (2/1 NCO/OH) which prepolymers can be further reacted with diols and additional diisocyanates to form segmented polyurethanes of varying segment size useful for water based, low VOC coatings. Or, segmented polyurethane prepolymers may be mixed with tackifying resins and used as a moisture-curable sealant, caulk or coating.

Acrylate-terminated prepolymers or macromonomers curable by free-radical processes can be prepared from the selectively deprotected hydrogenated hydroxyterminated polybutadiene polymers by reaction with a diisocyanate (2NCO/OH) followed by further reaction with hydroxyethyl acrylate in the presence of a basic reagent. Or, the selectively deprotected hydrogenated hydroxyterminated polybutadiene polymers may be reacted with methacryloyl chloride to produce a macromonomer which can be further deprotected selectively, the resulting freed hydroxyl groups reacted with other comonomers such as bisphenol A and phosgene or a diisocyanate plus a diol and then the terminal olefin can be copolymerized free radically with other comonomers such as, e.g., styrene or methyl methacrylate to lend interesting hydrophobic or hydrophilic properties to the resulting polymers.

The selectively deprotected monohydroxy terminated hydrogenated polybutadiene polymer may be reacted with functional comonomers, without simultaneously removing the other protective group, to produce novel block copolymers. These copolymers then may be selectively deprotected further and then reacted with the same or different comonomers to form yet other novel block copolymers. Thus, for example, the selectively deprotected monohydroxyterminated hydrogenated polybutadiene polymer may be reacted with ethylene oxide in the presence of potassium tert-butoxide to produce a poly(ethleneoxide)-hydrogenated polybutadiene copolymer with one protected hydroxyl group on the other end of the polybutadiene segment. This hydroxyl can then be deprotected and a poly(ethyleneoxide) polymer having different chain lengths grown onto both ends of the polybutadiene segment.

In another possible application, the selectively deprotected hydrogenated monohydroxyterminated polybutadiene may be reacted with an alkenylarylhalosilane such as styrenyldimethylchlorosilane to yield the corresponding omega-styrenylterminated macromonomer according to directions in U.S. Pat. No. 5,278,244, which may then be further polymerized by a variety of techniques to yield "comb" polymers which, on further selective deprotection, yield branched polymers with hydroxyfunctionality on the branch-ends. Such multi-functionality can be utilized to graft a water-soluble polymer such as polyethylene oxide onto a hydrophobic polyolefinic core to produce hydrogels.

In still another example, living polymers having the formula

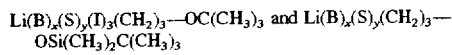

where B is polymerized butadiene, S is polymerized styrene, I is polymerized isoprene and x and y can vary from 10 to 1000 or more are reacted with divinylbenzene (DVB) to produce a multi-armed star polymer, according to U.S. Pat. No. 4,409,357, which on hydrogenation and selective removal of the t-butyldimethylsilyl groups yields a multi-arm polymer with some hydroxy-terminated branches. These hydroxy groups may be further reacted with a variety of di and multi-functional comonomers as described above to yield "hard" segment polymers surrounding the central "soft" core. The remaining hydroxyl groups can be freed by selective deprotection and either reacted with ethylene oxide and potassium alkoxide or with methacryloyl chloride followed by methyl methacrylate polymerization as described above to produce hydrogels.

Multi-arm polymers are useful as viscosity index improver for motor oils.

Typically employed comonomer formulas which can be polymerized with the selectively deprotected telechelically functional multi-arm stars of this invention are bisphenol A and phosgene, caprolactam and adipic acid, hexamethylene diamine and adipic acid, dimethyl terephthalate and 1,4-butanediol, and diphenyl methane diisocyanate and 1,4-butanediol, which produce, respectively, blocks of polycarbonate, polyamide, polyester, and polyurethane attached to the selectively deprotected telechelically functional polydiene, polyarylethylene, or polydiene/polyarylethylene arms of the star polymer. Where acid catalysis of such copolymerizations is employed, for example when the comonomer is a mixture of caprolactam and adipic acid and the catalyst is 85% phosphoric acid (aq) one may expect simultaneous deprotection of t-butyldimethylsilyl protecting groups to occur. Block arm lengths, as well as the nature of the blocks themselves, can be varied during copolymerization after each selective deprotection step to allow for the preparation of a wide spectrum of telechelically segmented block star coploymers. These products find utility in coatings, binders, sealants, and molding resins. Reference is made to U.S. Pat. Nos. 4,994,526 and 5,393,843 for further details of the copolymerizations.

The following examples further illustrate the invention.

EXPERIMENTAL

PREPARATION OF THE INITIATORS

Example A
Preparation of 3-(t-Butyldimethylsilyloxy)-1-propyllithium Chain Extended with 2 Moles of Isoprene Lot 8983 (461-68)

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloro-propane, 58.82 grams (0.268 mole, 1.00 equivalent) was added dropwise. An exotherm was detected after 31.8% of the feed had been added. A dry ice/hexane cooling bath was applied to maintain the reaction temperature at 60°–65° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60°–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solution, yield=530 ml, 425.34 grams. Total base=17.1 wt. %. Active C-Li=15.9 wt %. Yield (based on active C-Li)=80.8%.

Example B
Preparation of 3-(t-Butyldimethylsilylthio)-1-propyllithium Chain Extended with 2 Moles of Isoprene Lot 12083 (761-68)

HYPOTHETICAL

A 500 ml, three-necked Morton flask is equipped with a mechanical stirrer, a 125 ml. pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.20 grams (0.749 mole, 2.80 equivalents) is transferred to the flask with 260 ml cyclohexane. This suspension is stirred at 450 RPMs, and heated to 65° C. with a heating mantle. The heat source is removed. 1-(t-Butyldimethylsilylthio)-3-chloro-propane, 60.22 grams (0.268 mole, 1.00 equivalent) is added dropwise. An exotherm is detected after 21.8% of the feed has been added. A dry ice/hexane cooling bath is applied to maintain the reaction temperature at 60°–65° C. The total feed time is one hundred minutes. An exotherm is noted until the last drop of feed is added, then the temperature falls off rapidly to room temperature. The reaction mixture is stirred at room temperature for forty five minutes, then heated to 65° C. with a heating mantle. The heat source is removed. Isoprene, 36.45 grams (0.535 mole, 2.00 equivalents) is then added dropwise. An exotherm is noted after 24.6% of the feed has been added. Hexane cooling is applied to maintain the reaction temperature at 60°–65° C. The total isoprene feed time is thirty eight minutes. The reaction mixture is allowed to stir at room temperature for one hour, then transferred to a small pressure filter with argon pressure. Very rapid filtration is achieved with 2 psi argon. The muds are reslurried with cyclohexane (2×50 ml). This affords an orange solution; yield=530 ml, 435.21 grams. Total base=17.7 wt. %, Active C-Li=16.9 wt %. Yield (based on active C-Li)=82.4%.

Example C

Preparation of 3-(N,N-Dimethylamino)-1-propyllithium Chain Extended with 2 Moles of Isoprene, Lot 9314

A 500 ml, three-necked Morton flask was equipped with a mechanical stirrer, a 125 ml. pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 10.57 grams (1.520 moles) was transferred to the flask with 250 ml cyclohexane. Coarse sand, 45.3 grams, was added to the reaction mixture. This suspension was stirred at 600–675 RPMs, and heated to 37° C. with a heating mantle. The heat source was removed. 1-Chloro-3-(N,N-dimethylamino)propane, 19.64 grams (0.1615 mole) dissolved in 120 ml. cyclohexane was added dropwise. An exotherm (up to 52° C.) was detected after 7% of the feed had been added. A dry ice/hexane cooling bath was applied to maintain the reaction temperature at 41°–44° C. The total feed time was thirty-two minutes. An exotherm was noted until the last drop of feed was added, then the temperature was maintained at 36°–40° C. for an additional thirty minutes. The reaction mixture was then transferred to a sintered glass filter while still warm. The filtration was complete in three minutes with three psi argon pressure. This afforded a hazy suspension. Yield=400 ml., 298.2 grams. Active C—Li=0.361M (0.469 m/kg) @40° C. Yield (based on active C—Li=87%.

The product crystallized from solution upon standing at room temperature. The concentration of the clear supernatant solution was about 0.3M.

A dry 500 ml round bottom flask was fitted with a magnetic stir bar, and an argon inlet. This apparatus was purged with argon, then 154.77 grams (0.0726 mole) of the suspension prepared above was added to the flask. Isoprene, 9.4 grams (0.138 mole, 1.90 equivalents) was then added all at once. The reaction mixture was then heated to 48°–49° C. for forty minutes. This afforded a slightly hazy golden solution, which was partially vacuum-stripped on the rotary evaporator to afford the product solution. Yield=43.32 grams. Active C—Li=1.36M (1.65 m/kg). Recovered yield (based on active C—Li)=98.5%.

EXAMPLES OF THE INVENTION—PREPARATION OF POLYMERS

Example 1

Synthesis of t-Butoxy and t-Butyidimethylsilyloxy Functionalized Polyisoprene Star A glass reactor was equipped with three break-seal reagent ampoules, a sampling port attached with a Teflon stopcock, an inlet tube fitted a septum cap, and a magnetic stir bar. This reactor was flame sealed to a high vacuum line, and evacuated at 120° C. for 8 hours. The flask was refilled with dry argon, and allowed to cool to room temperature. 3-(1,1-Dimethylethoxy)-1-propyllithium chain extended with 2 moles of isoprene in toluene, $2.67 \times 10^{-4}$ moles (0.89 ml., 0.3M) and 3-(t-butyldimethylsilyloxy)-1-propyllithium in cyclohexane, $2.52 \times 10^{-4}$ moles (0.36 ml., 0.7M) were added to the reactor with a syringe via the inlet tube. The inlet tube was then flame sealed, and the reactor was re-evacuated. Dry cyclohexane solvent, 200 ml., was then distilled directly into the reactor. The flask was then removed from the vacuum line by a flame seal. The reactor was then heated to 50° C., and 20.43 grams (30 ml.) of isoprene was added from a break seal ampoule The reaction mixture was held at 50°–55° C. for five hours. A 2 ml. aliquot was withdrawn through the sample port, and quenched with methanol. The resultant base polymer was analyzed by SEC. The temperature was increased to 60° C., then divinylbenzene $1.39 \times 10^{-3}$ moles (0.36 ml., 3.0 equivalents) was added from a break seal ampoule. The reaction mixture was stirred at 60° C. for nine hours, then quenched with degassed methanol (1.5 ml.) added from the last break seal ampoule. The polymer was recovered by precipitation two times into methanol, and vauum dried.

The resultant functionalized base polymer was characterized by SEC, and had the following properties: Mn=44,000 g/mole The resultant functionalized star polymer was fully characterized by $^1$H NMR and SEC, and had the following properties:

Mn=245,000 g/mole (based on linear polyisoprene standards).

Mw/Mn=1.12

% Unlinked=11%

The $^1$H NMR spectrum exhibited peaks at 1.17 ppm for the t-butoxy group and at 0.88 ppm for the t-butyidimethylsilyloxy group.

Example 2

Selective Deprotection of Tert-Butyidimethylsilyloxy Group from Functionalized Polyisoprene Star A 100 ml., flask was fitted with a magnetic stir bar, a reflux condenser, and a nitrogen inlet. This apparatus was dried in an oven overnight at 125° C., assembled hot, and allowed to cool in a stream of nitrogen. Tert-butoxy-t-butyldimethylsilyloxy functionalized star polymer, prepared in Example 1, (1.0 gram) and tetrahydrofuran (10 ml) were added to the flask. This was followed by three drops of 1.37 Normal aqueous hydrochloric acid. The reaction mixture was heated to reflux for four hours. The reaction mixture was allowed to cool to room temperature. After solvent removal and vacuum drying, the resultant polymer was analyzed by $^1$H NMR.

The t-butoxy group was still present (1.19 ppm), while the t-butyldimethylsilyloxy group (0.89 ppm) was completely absent.

Example 3

Complete Deprotection of Functionalized Polyisoprene Star

A 100 ml., flask was fitted with a magnetic stir bar, a reflux condenser, and a nitrogen inlet. This apparatus was dried in an oven overnight at 125° C., assembled hot, and allowed to cool in a stream of nitrogen. The partially deprotected tert-butoxy functionalized star polymer, prepared in Example 2, (1.00 gram), toluene 10 ml) and Amberlyst® 15 resin (0.50 grams) were added to the flask.

The reaction mixture was heated to reflux for thirteen hours. The reaction mixture was allowed to cool to room temperature. The Amberlyst® 15 resin was removed by filtration. After solvent removal and vacuum drying, the resultant polymer was analyzed by $^1$H NMR.

The t-butoxy group was completely absent (1.19 ppm).

Example 4

Synthesis of t-Butoxy and t-Butyidimethylsilyloxy Functionalized Multi-Arm Hydrogenated Polybutadiene Star

HYPOTHETICAL

A glass reactor is equipped with three break-seal reagent ampoules, a sampling port attached with a Teflon stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium chain extended with 2 moles of isoprene in toluene, $2.67\times10^{-4}$ moles (0.89 ml., 0.3M) and 3-(t-butyidimethylsilyloxy)-1-propyllithium in cyclohexane, $2.52\times10^{-4}$ moles (0.36 ml., 0.7M) are added to the reactor with a syringe via the inlet tube. The inlet tube is then flame sealed, and the reactor is re-evacuated. Dry cyclohexane solvent, 200 ml., is then distilled directly into the reactor. The flask is then removed from the vacuum line by a flame seal. The reactor is then heated to 50° C., and 20.43 grams (30 ml.) of butadiene is added from a break seal ampoule. The reaction mixture is held at 50°–55° C. for five hours. A 2 ml. aliquot is withdrawn through the sample port, and quenched with methanol. The resultant base polymer is analyzed by SEC. The temperature is increased to 60° C., then divinylbenzene $1.53\times10^{-3}$ moles (0.39 ml., 3.3 equivalents) is added from a break seal ampoule. The reaction mixture is stirred at 60° C. for nine hours, then quenched with degassed methanol (1.5 ml.) added from the last break seal ampoule. The polymer is recovered by precipitation two times into methanol, and vauum dried.

The resultant functionalized base polymer is characterized by SEC, and has the following properties: Mn=33.000 g/mole Mw/Mn=1.07

The resultant functionalized multi-arm star polymer is fully characterized by $^1$H NMR and SEC, and has the following properties: Mn=239.000 g/mole (based on linear polybutadiene standards). Mw/Mn=1.12% Unlinked=12%

The $^1$H NMR spectrum exhibits peaks at 1.17 ppm for the t-butoxy group and at 0.88 ppm for the t-butyidimethylsilyloxy group.

Hydrogenation of the telechelic t-butoxy-, t-butyidimethylsilyloxy functionalized multi-arm polybutadiene was carried out as follows:

The hydrogenation catalyst is preformed by mixing 1.00 gram (8% in pentane) nickel octoate and 0.76 grams of triethylaluminum (25% in cyclohexane) in a small, dry vial. The dry hydrogenation vessel is purged with argon, then charged with the polymer prepared above, purified cyclohexane, and finally, the catalyst (prepared above). The atmosphere is exchanged with hydrogen gas by pressuring the vessel up to 20 psi, and then releasing the pressure. This is repeated 5 times. The pressure is then increased to 90 psi, and the magnetically stirred solution is then heated to 70° C. The hydrogenation is conducted for twelve hours. The reaction mixture is then allowed to cool to room temperature, and the hydrogen pressure is released. The catalyst is removed by washing the polymer with dilute acid (0.5% hydrochloric acid) three times. The polymer is recovered and dried.

The resultant, saturated multi-arm polybutadiene polymer is fully characterized by $^1$H NMR, IR and SEC, and has the following properties: Mn=240.000 g/mole (based on linear polybutadiene standards).

$^1$H NMR indicates that all the aliphatic unsaturation (4.50–5.20 ppm) is consumed, and that the t-butoxy group is still present (1.15 ppm). IR indicates all the aliphatic double bond absorptions at 800–900 and 1650–1670 wavenumbers are gone.

Example 5

Preparation of a Block Copolymer from the Selectively Deprotected Polybutadiene Multiarm Polymer of Example 4

HYPOTHETICAL

A weight of 30.00 grams of the selectively deprotected polymer of Example 4 is dissolved in 300 ml of cyclohexane and treated with 1.05 g of methacryloyl chloride and 1.00 g of pyridine at 35°–45° C. with stirring for a period of 8 hr. The mixture is poured into an equal volume of water and stirred thoroughly. The organic layer is separated, washed several times with water, and dried. The methacrylate-terminated polymer solution is treated further with 10 grams of styrene in the presence of an organic peroxide at 35°–50° C. over a period of several hours to yield a solution of a segmented block multi-arm star possessing outer segments of styrene attached to inner segments of hydrogenated polybutadiene on each of the selectively deprotected arms of the polymer (approximately half of the arms).

Example 6

Further Total Deprotection of the Polymer of Example 5 and Reaction of the Resulting Hydroxyterminated Polymer

HYPOTHETICAL

Following the conditions of Example 3, the remaining t-butyl protective groups are removed from the polymer of Example 5 to yield a polymer where half the arms are polystyrene/hydrogenated polybutadiene block copolymers and the other half of the arms are hydrogenated polybutadiene capped with hydroxyl groups. This polymer is further reacted as follows:

A weight of 30.00 grams of the totally deprotected polymer of Example 5 is dissolved in 300 ml of toluene and treated with 1.05 g of methacryloyl chloride and 1.00 g of pyridine at 35°–45° C. with stirring for a period of 8 hr. The mixture is poured into an equal volume of water and stirred thoroughly. The organic layer is separated, washed several times with water, and dried. The methacrylate-terminated polymer solution is now treated further with 20 grams of methyl methacrylate in the presence of an organic peroxide at 35°–50° C. over a period of several hours to yield a solution of a segmented block multi-arm star where half the arms of the polymer possess outer segments of polystyrene attached to inner segments of hydrogenated polybutadiene and the other half of the arms of the polymer possess outer segments of polymethylmethacrylate attached to inner segments of hydrogenated polybutadiene. The residual polymer after solvent evaporation is useful as a compatibilizer for a number of different resins and elastomers.

Example 7

Synthesis of t-Butoxy and Dimethylamino Functionalized Polyisoprene/Polystryene Star A glass reactor was equipped with three break-seal reagent ampoules, a sampling port attached with a Teflon stopcock, an inlet tube fitted a septum cap, and a magnetic stir bar. This reactor was flame sealed to a high vacuum line, and evacuated at 120° C. for 8 hours. The flask was refilled with dry argon, and allowed to cool to room temperature. 3-(1,1-Dimethylethoxy)-1-propyllithium chain extended with 2 moles of isoprene in toluene, $2.67 \times 10^{-4}$ moles, and 3-(dimethylamino)-1-propyllithium in cyclohexane, $2.52 \times 10^{-4}$ moles, were added to the reactor with a syringe via the inlet tube. The inlet tube was then flame sealed, and the reactor was re-evacuated. Dry cyclohexane solvent, 200 ml., was then distilled directly into the reactor. The flask was then removed from the vacuum line by a flame seal. The reactor was then heated to 50° C., and 20.43 grams (30 ml.) of an 84:16 (wt./wt.) mixture of isoprene/styrene was added from a break seal ampoule The reaction mixture was held at 50°–55° C. for five hours. A 2 ml. aliquot was withdrawn through the sample port, and quenched with methanol. The resultant base polymer was analyzed by SEC. The temperature was increased to 60° C., then divinylbenzene $1.39 \times 10^{-3}$ moles (0.36 ml., 3.0 equivalents) was added from a break seal ampoule. The reaction mixture was stirred at 60° C. for nine hours, then quenched with degassed methanol (1.5 ml.) added from the last break seal ampoule. The polymer was recovered by precipitation two times into methanol, and vauum dried.

The resultant functionalized base polymer was characterized by SEC, and had the following properties: Mn=65,300 g/mole Mw/Mn=1.06

The resultant functionalized star polymer was fully characterized by $^1$H NMR and SEC, and had the following properties: Mn=303,800 g/mole (based on linear polyisoprene standards). Mw/Mn=1.12 % Unlinked=36%

The $^1$H NMR spectrum exhibited peaks at 1.17 ppm for the t-butoxy group and at 2.20 ppm for the dimethylamino group.

The resultant elastomeric product provided excellent cross-linking properties when used as an additive to tire rubber/carbon-black vulcanizates.

Example 8

Selective Deprotection of Tert-Butoxy Group from Functionalized Polyisoprene/Polystryene Star

HYPOTHETICAL

A 100 ml., flask is fitted with a magnetic stir bar, a reflux condenser, and a nitrogen inlet. This apparatus is dried in an oven overnight at 125° C., assembled hot, and allowed to cool in a stream of nitrogen. The tert-butoxy-, dimethylamino functionalized star polymer, prepared in Example 7, (1.00 gram), toluene (10 ml) and Amberlyst® 15 resin (0.50 grams) are added to the flask. The reaction mixture is heated to reflux for thirteen hours. The reaction mixture is allowed to cool to room temperature. The Amberlyst® 15 resin is removed by filtration. After solvent removal and vacuum drying, the resultant polymer is analyzed by $^1$H NMR.

The signal of the t-butoxy group is completely absent (1.19 ppm) and the signal from the dimethylamino group was still present (2.20 ppm).

Example 9

Preparation of Linear Telechelic t-Butoxy-, t-Butyldimethylsilyloxy-Terminated Polybutadiene

HYPOTHETICAL

A glass reactor is equipped with three break-seal reagent ampoules, a sampling port attached with a Teflon stopcock, an inlet tube fitted a septum cap, and a magnetic stir bar. This reactor is flame sealed to a high vacuum line, and evacuated at 120° C. for 8 hours. The flask is refilled with dry argon, and allowed to cool to room temperature. 3-(1,1-Dimethylethoxy)-1-propyllithium chain extended with 2 moles of isoprene in toluene, $2.67 \times 10^{-3}$ moles, and 3-(t-butyidimethylsilyloxy)-1-propyllithium in cyclohexane, $2.52 \times 10^{-3}$ moles, are added to the reactor with a syringe via the inlet tube. The inlet tube is then flame sealed, and the reactor is re-evacuated. Dry cyclohexane solvent, 200 ml., is then distilled directly into the reactor. The flask is then removed from the vacuum line by a flame seal. The reactor is then heated to 50° C., and 20.43 grams (0.378 moles) of butadiene is added from a break seal ampoule. The reaction mixture is held at 50°–55° C. for five hours. A 2 ml. aliquot is withdrawn through the sample port, and quenched with methanol. The resultant base polymer is analyzed by SEC. The temperature is increased to 60° C., then dimethyldichlorosilane ($2.7 \times 10^{-3}$ moles) is added from a break seal ampoule. The reaction mixture is stirred at 60° C. for nine hours, then quenched with degassed methanol (1.5 ml.) added from the last break seal ampoule. The polymer is recovered by precipitation two times into methanol, and vauum dried.

The resultant base polymer is characterized by SEC, and has the following properties: (Mn) of 4,000.

The coupled polymer is characterized by $^1$H NMR and SEC, and has the following properties: (Mn) of 8,000.

The $^1$H NMR spectrum exhibited peaks at 1.17 ppm for the t-butoxy group and at 0.88 ppm for the t-butyidimethylsilyloxy group.

Example 10

Hydrogenation of Telechelic t-Butoxy-, t-Butyldimethylsilyloxy Functionalized Linear Polybutadiene

HYPOTHETICAL

The hydrogenation catalyst is preformed by mixing 1.00 gram (8% in pentane) nickel octoate and 0.76 grams of triethylaluminum (25% in cyclohexane) in a small, dry vial. The dry hydrogenation vessel is purged with argon, then charged with the polymer prepared in Example 7, purified cyclohexane, and finally, the catalyst (prepared above). The atmosphere is exchanged with hydrogen gas by pressuring the vessel up to 20 psi, and then releasing the pressure. This is repeated 5 times. The pressure is then increased to 90 psi, and the magnetically stirred solution is then heated to 70° C. The hydrogenation is conducted for twelve hours. The reaction mixture is then allowed to cool to room temperature, and the hydrogen pressure is released. The catalyst is removed by washing the polymer with dilute acid (0.5% hydrochloric acid) three times. The polymer is recovered and dried.

The resultant saturated linear polybutadiene polymer is fully characterized by $^1$H NMR, IR and SEC, and has the following properties: Mn=8400 g/mole (based on linear polybutadiene standards).

$^1$H NMR indicates that all the aliphatic unsaturation (4.50–5.20 ppm) is consumed, and that the t-butoxy group (1.15 ppm) and the t-butyidimethylsilyloxy group (0.88 ppm) are both still present IR indicates all the aliphatic double bond absorptions at 800–900 and 1650–1670 wavenumbers are gone.

Example 11

Selective Deprotection of Hydrogenated Telechelic t-Butoxy-, t-Butyidimethylsilyloxy Polybutadiene

HYPOTHETICAL

A 100 ml., flask is fitted with a magnetic stir bar, a reflux condenser, and a nitrogen inlet. This apparatus is dried in an oven overnight at 125° C., assembled hot, and allowed to cool in a stream of nitrogen. tert-Butoxy-t-butyidimethylsilyloxy functionalized linear polybutadiene polymer, prepared in Example 11, (1.00 gram) and tetrahydrofuran (10 ml) are added to the flask. This is followed by three drops of 1.37 Normal aqueous hydrochloric acid. The reaction mixture is heated to reflux for four hours. The reaction mixture is allowed to cool to room temperature. After solvent removal and vacuum drying, the resultant polymer is analyzed by $^1$H NMR.

$^1$H NMR indicates the t-butoxy group is still present (1.19 ppm), while the t-butyldimethylsilyloxy group (0.89 ppm) is completely absent.

Example 12

Preparation of a Segmented Block Copolymer

HYPOTHETICAL

A 500 ml flask is charged with 200 ml of water, 250 ml of methylene chloride, one ml of triethylamine, 1.0 g of p-tert-butylphenol, 5.9 g (0.0007 moles) of the hydrogenated polymer of Example 10, and 50 g (0.22 moles) of bisphenol A. With stirring, phosgene is introduced into the flask at a rate of 1 g/min for 60 min while the pH is maintained at 10.5 to 11.5 by appropriate addition of 50% aq. NaOH. The layers are separated, the organic layer is washed with 3 wt % HCl until the washings remain acidic, and the layer is then washed with water. The resin is precipitated from solution into methanol and dried.

Complete deprotection of the resulting segmented block copolymer was carried out as follows:

A 100 ml., flask is fitted with a magnetic stir bar, a reflux condenser, and a nitrogen inlet. This apparatus is dried in an oven overnight at 125° C., assembled hot, and allowed to cool in a stream of nitrogen. The partially deprotected tert-butoxy functionalized polymer, (1.00 gram), toluene (10 ml) and Amberlyst® 15 resin (0.50 grams) are added to the flask. The reaction mixture is heated to reflux for thirteen hours. The reaction mixture is allowed to cool to room temperature. The Amberlyst® 15 resin is removed by filtration. After solvent removal and vacuum drying, the resultant polymer is analyzed by $^1$H NMR.

The t-butoxy group was completely absent (1.19 ppm).

The resulting deprotected polymer was further treated as above with more bisphenol A and phosgene to produce a segmented triblock polymer possessing outer dissimilarly sized "hard" polycarbonate segments surrounding an inner "soft" hydrogenated polybutadiene segment. The product possesses unusually high impact strength and good abrasion resistance and is useful as a molding resin to prepare exterior components for automobiles.

This invention concerns novel, unsymmetrically protected, telechelically functionalized linear and star or multi-arm polymers, their optionally hydrogenated analogues, the polymers produced by selective removal of the protecting groups, the segmented block polymers produced by further reaction of these selectively deprotected polymers with selected comonomers, and the processes to prepare these polymers.

What is claimed is:

1. A process for the preparation of linear and multi-arm polymers possessing dissimilarly protected telechelic functionalities comprising polymerizing, one or more conjugated dienes or one or more alkenylaromatic compounds or mixtures thereof, in a liquid reaction medium, at a temperature of -30° C. to 150° C., for a period of at least one hour, with at least two protected functionalized initiators, each of which contains a differently protected hydroxyl, amino, alkylamino, or sulfhydryl group, having the formula

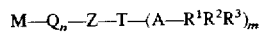

wherein M is an alkali metal; Q is an unsaturated hydrocarbyl group derived by incorporation of one or more conjugated diene hydrocarbons, one or more alkenylaromatic compounds, or mixtures of one or more dienes with one or more alkenylaromatic compounds into the M—Z linkage; Z is a branched or straight chain hydrocarbon connecting group which contains 3–25 carbon atoms; T is oxygen, sulfur, or nitrogen; $(AR^1R^2R^3)_m$ is a protecting group, in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; n is an integer from 0 to 5; and m is 1 when T is oxygen or sulfur, and 2 when T is nitrogen, to produce "living" polymer anions which are reacted with at least one compound selected from the group consisting of di- and polyfunctional linking agents to produce dissimilarly protected telechelically functionalized linear or multi-arm polymers, and optionally hydrogenating the resulting polymers.

2. A process for the preparation of linear and multi-arm polymers of claim 1 possessing dissimilarly protected telechelic functionalities wherein the conjugated dienes are selected from the group consisting of butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and mixtures of these.

3. A process for the preparation of linear and multi-arm polymers of claim 1 possessing dissimilarly protected telechelic functionalities wherein the alkenylaromatic compound is selected from the group consisting of styrene, alpha-methylstyrene, vinyltoluene, 2-vinylpyridine, 4-vinylpyridine, 4-(tert-butyl)-styrene, 1-vinylnaphthalene, 2-vinylnaphthalene, 1-alpha-methylvinylnaphthalene, 2-alpha-methylvinylnaphathalene, 1,2-diphenyl-4-methylhexene-1,3-methylstyrene, 3,5-diethylstyrene, 2-ethyl-4-benzylstyrene, 4-phenylstyrene, 4-p-tolylstyrene, 2,4-divinyltoluene, 4,5-dimethyl-1-vinylnaphthalene and mixtures of these.

4. A process for the preparation of linear and multi-arm polymers of claim 1 possessing dissimilarly protected telechelic functionalities wherein the polymerization of the conjugated diene(s), alkenylaromatic compound(s) or mixture(s) thereof with at least two protected functional initiators is carried out simultaneously in the same reaction vessel.

5. A process for the preparation of linear and multi-arm polymers of claim 1 possessing dissimilarly protected telechelic functionalities wherein the polymerization of the conjugated diene(s), alkenylaromatic compound(s) or mixture(s) thereof with each protected functional initiator is carried out separately in two different vessels.

6. A process for the preparation of linear and multi-arm polymers of claim 1 possessing dissimilarly protected

27 telechelic functionalities wherein the conjugated diene(s), alkenylaromatic compound(s) or mixture(s) thereof in each of the two reaction vessels is different.

7. The process of claim 1 wherein each component of the mixture of conjugated diene(s) and alkenylaromatic compound(s) is added sequentially to the polymerization vessel.

8. The process of claim 1 wherein the protected functionalized initiators are selected from the group consisting of omega-(tert-alkoxy)-1-alkyllithiums, omega-(tert-alkoxy)-1-alkyllithiums chain extended with conjugated alkadienes or alkenyl aromatic compounds, omega-(tert-alkylthio)-1-alkyllithiums, omega-(tert-alkylthio)-1-alkyllithiums chain extended with conjugated alkadienes or alkenyl aromatic compounds, omega-(tert-butyldimethylsilyloxy)-1-alkyllithiums, omega-(tert-butyldimethylthio)-1-alkyllithiums, omega-(dialkylamino)-1-alkyllithiums, omega-(dialkylamino)-1-alkyllithiums chain-extended with conjugated alkadienes or alkenyl aromatic compounds, and omega-(bis-tert-alkylsilylamino)-1-alkyllithiums.

9. The process of claim 1 wherein the protected functionalized initiators are selected from the group consisting of 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyidimethylsilyloxy)-1-octyllithium and 3-(trimethylsilyloxy)-2,2-dimethyl-1-propyllithium 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 3-(hexamethyleneimino)-2-methyl-1-propyllithium, 3-(hexamethyleneimino)-2,2-dimethyl-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium 6-(t-butyldimethylsilylthio)-1-hexyllithium, and 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-

28 dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium and their chain-extended analogues with isoprene, styrene or butadiene.

10. The process of claim 1 wherein the linking agents are selected from the group consisting of di-, tri- and tetrahalosilanes, polyhalodisilanes, di- and tri-haloalkylsilanes, polyhaloalkyldisilanes, di-, tri-, and tetrahalostannanes, di- and tri-haloalkylstannanes, 1,2-divinylbenzene, 1,3-divinylbenzene, 1,4-divinylbenzene, 1,2,4-trivinylbenzene, 1,3-divinylnaphthalene, 1,8-divinylnaphthalene, 1,2-diisopropenylbenzene, 1,3-diisopropenylbenzene, 1,4-diisopropenylbenzene, and 1,3,5-trivinylnaphthalene.

11. A process for the preparation of linear and multi-arm polymers of claim 1, wherein M is lithium.

12. A process for the preparation of linear and multi-arm polymers of claim 1, wherein said liquid reaction media comprises a non-polar solvent selected from the group consisting of aliphatic, cycloaliphatic and aromatic hydrocarbons having 3 to 12 carbon atoms.

13. A process for the preparation of linear and multi-arm polymers of claim 12, wherein said non-polar solvent is selected from the group consisting of aliphatic, cycloaliphatic and aromatic hydrocarbons having 4 to 8 carbon atoms.

14. A process for the preparation of linear and multi-arm polymers of claim 12, wherein said non-polar Solvent is selected from the group consisting of pentane, hexane, cyclohexane, methylcyclohexane, heptane, methylcycloheptane, octane, decane, benzene, toluene, ethylbenzene, p-xylene, m-xylene, o-xylene, n-propylbenzene, isopropylbenzene, n-butylbenzene, and mixtures thereof.

15. A process for the preparation of linear and multi-arm polymers of claim 1, wherein said liquid reaction media further comprises a polar solvent selected from the group consisting of aliphatic and cycloaliphatic ethers, aliphatic and cycloaliphatic tertiary amines, and mixtures thereof, wherein the proportion of polar to non-polar solvent is not greater than 1 to 5.

16. A process for the preparation of linear and multi-arm polymers of claim 15, wherein said aliphatic and cycloaliphatic ethers are selected from the group consisting of ethyl ether, dimethyl ether, methyl-tert-butyl ether, 1,2-dimethoxyethane, 1,2-diethoxyethane, dioxane, 2-methyltetrahydrofuran, tetrahydrofuran and mixtures thereof, and said aliphatic and cycloaliphatic tertiary amines are selected from the group consisting of triethylamine, trimethylamine, N-methylpiperidine, N-methylpyrrolidine, diazabicyclo[2.2.2]octane, $N,N,N^1,N^1$-tetramethylenediamine, and mixtures thereof.

17. A process according to claim 1, wherein one of said at least two dissimilarly protected functionalized initiators is a compound in which Z is a straight chain hydrocarbon connecting group; T is oxygen; A is carbon; and each of $R^1$, $R^2$, and $R^3$ is alkyl; and wherein the other of said at least two dissimilarly protective functionalized initiators is a compound in which Z is a straight chain hydrocarbon group; T is oxygen; A is silicon; and each of $R^1$, $R^2$, and $R^3$ is alkyl.

18. The linear and multi-arm polymers possessing dissimilarly protected telechelic functionalities prepared by the process comprising polymerizing, one or more conjugated dienes or one or more alkenylaromatic compounds or mixtures thereof, in a liquid reaction medium, at a temperature of –30° C. to 150° C., for a period of at least one hour, with at least two protected functionalized initiators, each of which contains a differently protected hydroxyl, amino, alkylamino, or sulfhydryl group, having the formula

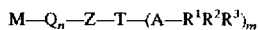

wherein M is an alkali metal; Q is an unsaturated hydrocarbyl group derived by incorporation of one or more conjugated diene hydrocarbons, one or more alkenylaromatic compounds, or mixtures of one or more dienes with one or more alkenylaromatic compounds into the M—Z linkage; Z is a branched or straight chain hydrocarbon connecting group which contains 3–25 carbon atoms; T is oxygen, sulfur, or nitrogen; $(AR^1R^2R^3)_m$ is a protecting group, in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; n is an integer from 0 to 5; and m is 1 when T is oxygen or sulfur, and 2 when T is nitrogen, to produce "living" polymer anions which are reacted with at least one compound selected from the group consisting of di- and polyfunctional linking agents to produce dissimilarly protected telechelically functionalized linear or multi-arm polymers, and optionally hydrogenating the resulting polymers.

19. The linear and multi-arm polymers possessing dissimilarly protected telechelic functionalities of claim 18 wherein the conjugated dienes polymerized are selected from the group consisting of butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and mixtures of these.

20. The linear and multi-arm polymers possessing dissimilarly protected telechelic functionalities of claim 18 wherein the alkenylaromatic compound polymerized is selected from the group consisting of styrene, alpha-methylstyrene, vinyltoluene, 2-vinylpyridine, 4-vinylpyridine, 4-(tert-butyl)-styrene, 1-vinylnaphthalene, 2-vinylnaphthalene, 1-alpha-methylvinylnaphthalene, 2-alpha-methylvinylnaphathalene, 1,2-diphenyl-4-methylhexene-1,3-methylstyrene, 3,5-diethylstyrene, 2-ethyl-4-benzylstyrene, 4-phenylstyrene, 4-p-tolylstyrene, 2,4-divinyltoluene, 4,5-dimethyl-1-vinylnaphthalene and mixtures of these.

21. The linear and multi-arm polymers possessing dissimilarly protected telechelic functionalities of claim 18 wherein the polymerization of the conjugated diene(s), alkenylaromatic compound(s) or mixture(s) thereof with at least two protected functional initiators is carried out simultaneously in the same reaction vessel.

22. The linear and multi-arm polymers possessing dissimilarly protected telechelic functionalities of claim 18 wherein the polymerization of the conjugated diene(s), alkenylaromatic compound(s) or mixture(s) thereof with each protected functional initiator is carried out separately in two different vessels.

23. The linear and multi-arm polymers possessing dissimilarly protected telechelic functionalities of claim 18 wherein the conjugated diene(s), alkenylaromatic compound (s) or mixture(s) thereof in each of the two reaction vessels is different.

24. The linear and multi-arm polymers possessing dissimilarly protected telechelic functionalities of claim 18 wherein each component of the mixture of conjugated diene(s) and alkenylaromatic compound(s) is added sequentially to the polymerization vessel.

25. The linear and multi-arm polymers possessing dissimilarly protected telechelic functionalities of claim 18 wherein the protected functionalized initiators are selected from the group consisting of omega-(tert-alkoxy)-1-alkyllithiums, omega-(tert-alkoxy-1-alkyllithiums chain extended with conjugated alkadienes or alkenyl aromatic compounds, omega-(tert-alkylthio)-1-alkyllithiums, omega-(tert-alkylthio)-1-alkyllithiums chain extended with conjugated alkadienes or alkenyl aromatic compounds, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes or alkenyl aromatic compounds, and omega-(bis-tert-alkylsilylamino)-1-alkyllithiums.

26. The linear and multi-arm polymers possessing dissimilarly protected telechelic functionalities of claim 18 wherein the protected functionalized initiators are selected from the group consisting of 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyidimethylsilyloxy)-2,2-dimethyl-1-propyllithium, 4-(t-butyidimethylsilyloxy)-1-butyllithium, 5-(t-butyidimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 3-(hexamethyleneimino)-2-methyl-1-propyllithium, 3-(hexamethyleneimino)-2,2-dimethyl-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium 6-(t-butyldimethylsilylthio)-1-hexyllithium, and 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1- dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium and their chain-extended analogues with isoprene, styrene or butadiene.

27. The linear and multi-arm polymers possessing dissimilarly protected telechelic functionalities of claim 18 wherein the linking agents are selected from the group consisting of di-, tri- and tetrahalosilanes, polyhalodisilanes, di- and tri-haloalkylsilanes, polyhaloalkyldisilanes, di-, tri-, and tetrahalostannanes, di- and tri-haloalkylstannanes, 1,2-divinylbenzene, 1,3-divinylbenzene, 1,4-divinylbenzene, 1,2,4-trivinylbenzene, 1,3-divinylnaphthalene, 1,8-divinylnaphthalene, 1,2-diisopropenylbenzene, 1,3-diisopropenylbenzene, 1,4-diisopropenylbenzene, and 1,3,5-trivinylnaphthalene.

28. The linear and multi-arm polymers possessing dissimilarly protected telechelic functionalities of claim 18, wherein M is lithium.

29. The linear and multi-arm polymers possessing dissimilarly protected telechelic functionalities of claim 18, wherein said liquid reaction media comprises a non-polar solvent selected from the group consisting of aliphatic, cycloaliphatic and aromatic hydrocarbons having 3 to 12 carbon atoms.

30. The linear and multi-arm polymers possessing dissimilarly protected telechelic functionalities of claim 29, wherein said non-polar solvent is selected from the group consisting of aliphatic, cycloaliphatic and aromatic hydrocarbons having 4 to 8 carbon atoms.

31. The linear and multi-arm polymers possessing dissimilarly protected telechelic functionalities of claim 29, wherein said non-polar solvent is selected from the group consisting of pentane, hexane, cyclohexane, methylcyclohexane, heptane, methylcycloheptane, octane, decane, benzene, toluene, ethylbenzene, p-xylene, m-xylene, o-xylene, n-propylbenzene, isopropylbenzene, n-butylbenzene, and mixtures thereof.

32. The linear and multi-arm polymers possessing dissimilarly protected telechelic functionalities of claim 18, wherein said liquid reaction media further comprises a polar solvent selected from the group consisting of aliphatic and cycloaliphatic ethers, aliphatic and cycloaliphatic tertiary amines, and mixtures thereof, wherein the proportion of polar to non-polar solvent is not greater than 1 to 5.

33. The linear and multi-arm polymers possessing dissimilarly protected telechelic functionalities of claim 32, wherein said aliphatic and cycloaliphatic ethers are selected from the group consisting of ethyl ether, dimethyl ether, methyl-tert-butyl ether, 1,2-dimethoxyethane, 1,2-diethoxyethane, dioxane, 2-methyltetrahydrofuran, tetrahydrofuran and mixtures thereof, and said aliphatic and cycloaliphatic tertiary amines are selected from the group consisting of triethylamine, trimethylamine, N-methylpiperidine, N-methylpyrrolidine, diazabicyclo[2.2.2]octane, N,N,N¹,N¹-tetramethylenediamine, and mixtures thereof.

34. A polymer according to claim 18, wherein one of said at least two protected dissimilarly functionalized initiators is a compound in which Z is a straight chain hydrocarbon connecting group; T is oxygen; A is carbon; and each of R¹, R², and R³ is alkyl; and wherein the other of said at least two dissimilarly protective functionalized initiators is a compound in which Z is a straight chain hydrocarbon group; T is oxygen; A is silicon; and each of R¹, R², and R³ is alkyl.

35. A process for the preparation of linear and multi-arm polymers possessing one free telechelically functional group and at least one protected telechelically functional group comprising polymerizing, one or more conjugated dienes or one or more alkenylaromatic compounds or mixtures thereof, in a liquid reaction medium, at a temperature of −30° C. to 150° C., for a period of at least one hour, with at least two protected functionalized initiators, each of which contains a differently protected hydroxyl, amino, alkylamino, or sulfhydryl group, having the formula

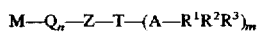

wherein M is an alkali metal; Q is an unsaturated hydrocarbyl group derived by incorporation of one or more conjugated diene hydrocarbons, one or more alkenylaromatic compounds, or mixtures of one or more dienes with one or more alkenylaromatic compounds into the M—Z linkage; Z is a branched or straight chain hydrocarbon connecting group which contains 3–25 carbon atoms; T is oxygen, sulfur, or nitrogen; $(AR^1R^2R^3)_m$ is a protecting group, in which A is an element selected from Group IVa of the Periodic Table of the Elements; R¹, R², and R³ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; n is an integer from 0 to 5; and m is 1 when T is oxygen or sulfur, and 2 when T is nitrogen, to produce "living" polymer anions which are reacted with at least one compound selected from the group consisting of di- and polyfunctional linking agents to produce dissimilarly protected telechelically functionalized linear or multi-arm polymers, optionally hydrogenating the resulting polymers, and selectively removing one type of protective group on the dissimilarly protected functionalities on the end(s) of the arms of the linear or multi-arm polymer chains using selective reagents specifically suited to remove the more easily removable protective group, —A—R¹R²R³, and liberate the desired functionality, —T—H$_m$ on the end(s) of the polymer chains to produce linear or multi-arm polymers with unprotected hydroxyl, sulfhydryl, or amino groups on the ends of some of the arms of the polymer and protected hydroxyl, sulfhydryl, or amino groups on the end(s) of the other arm(s) of the linear or multi-arm polymers.

36. A process for the preparation of linear and multi-arm polymers of claim 35 wherein the conjugated dienes are selected from the group consisting of butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene and mixtures of these.

37. A process for the preparation of linear and multi-arm polymers of claim 35 wherein the alkenylaromatic compound is selected from the group consisting of styrene, alpha-methylstyrene, vinyltoluene, 2-vinylpyridine, 4-vinylpyridine, 4-(tert-butyl)-styrene, 1-vinylnaphthalene, 2-vinylnaphthalene, 1-alpha-methylvinylnaphthalene, 2-alpha-methylvinylnaphathalene, 1,2-diphenyl-4-methylhexene-1,3-methylstyrene, 3,5-diethylstyrene, 2-ethyl-4-benzylstyrene, 4-phenylstyrene, 4-p-tolylstyrene, 2,4-divinyltoluene, 4,5-dimethyl-1-vinylnaphthalene and mixtures of these.

38. A process for the preparation of linear and multi-arm polymers of claim 35 wherein the polymerization of the conjugated diene(s), alkenylaromatic compound(s) or mixture(s) thereof with at least two protected functional initiators is carried out simultaneously in the same reaction vessel.

39. A process for the preparation of linear and multi-arm polymers of claim 35 wherein the polymerization of the conjugated diene(s), alkenylaromatic compound(s) or mixture(s) thereof with each protected functional initiator is carried out separately in two different vessels.

40. A process for the preparation of linear and multi-arm polymers of claim 35 wherein the conjugated diene(s), alkenylaromatic compound(s) or mixture(s) thereof in each of the two reaction vessels is different.

41. A process for the preparation of linear and multi-arm polymers of claim 35 wherein each component of the mixture of conjugated diene(s) and alkenylaromatic compound(s) is added sequentially to the polymerization vessel.

42. A process for the preparation of linear and multi-arm polymers of claim 35 wherein the protected functionalized initiators are selected from the group consisting of omega-(tert-alkoxy)-1-alkyllithiums, omega-(tert-alkoxy)-1-alkyllithiums chain extended with conjugated alkadienes or alkenylaromatic compounds, omega-(tert-alkylthio)-1-alkyllithiums, omega-(tert-alkylthio)-1-alkyllithiums chain extended with conjugated alkadienes or alkenylaromatic compounds, omega-(tert-butyidimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes or alkenyl aromatic compounds, and omega-(bis-tert-alkylsilylamino)-1-alkyllithiums.

43. A process for the preparation of linear and multi-arm polymers of claim 35 wherein the protected functionalized initiators are selected from the group consisting of 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyidimethylsilyloxy)-1-propyllithium, 3-(t-butyidimethylsilyloxy)-2-methyl-1-propyllithium, 3-(t-butyidimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyidimethylsilyloxy)-1-hexyllithium, 8-(t-butyidimethylsilyloxy)-1-octyllithium and 3-(trimethylsilyloxy)-2,2-dimethyl-1-propyllithium 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 3-(hexamethyleneimino)-2-methyl-1-propyllithium, 3-(hexamethyleneimino)-2,2-dimethyl-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium 6-(t-butyldimethylsilylthio)-1-hexyllithium, and 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium and their chain-extended analogues with isoprene, styrene, or butadiene.

44. A process for the preparation of linear and multi-arm polymers of claim 35 wherein the linking agents are selected from the group consisting of di-, tri- and tetrahalosilanes, polyhalodisilanes, di- and tri-haloalkylsilanes, polyhaloalkyldisilanes, di-, tri-, and tetrahalostannanes, di- and tri-haloalkylstannanes, 1,2-divinylbenzene, 1,3-divinylbenzene, 1,4-divinylbenzene, 1,2,4-trivinylbenzene, 1,3-divinylnaphthalene, 1,8-divinylnaphthalene, 1,2-diisopropenylbenzene, 1,3-diisopropenylbenzene, 1,4-diisopropenylbenzene, and 1,3,5-trivinylnaphthalene.

45. A process for the preparation of linear and multi-arm polymers of claim 35 wherein the more easily removable protective groups are selected from the group consisting of t-butyldimethylsilyl, trimethylsilyl, triethylsilyl, triisopropylsilyl, ethyldimethylsilyl, phenyldimethylsilyl, diphenylmethylsilyl, and di-t-butylmethylsilyl groups.

46. A process for the preparation of linear and multi-arm polymers of claim 35 wherein the selective reagents for removing the more easily removable protective group are selected from the group consisting of tetrabutylammonium fluoride, potassium fluoride and 18-crown-6, or pyridine-hydrofluoric acid complex, dilute hydrochloric acid, dilute phosphoric acid, and acetic acid.

47. A process for the preparation of linear and multi-arm polymers of claim 35, wherein M is lithium.

48. A process for the preparation of linear and multi-arm polymers of claim 35, wherein said liquid reaction media comprises a non-polar solvent selected from the group consisting of aliphatic, cycloaliphatic and aromatic hydrocarbons having 3 to 12 carbon atoms.

49. A process for the preparation of linear and multi-arm polymers of claim 48, wherein said non-polar solvent is selected from the group consisting of aliphatic, cycloaliphatic and aromatic hydrocarbons having 4 to 8 carbon atoms.

50. A process for the preparation of linear and multi-arm polymers of claim 48, wherein said non-polar solvent is selected from the group consisting of pentane, hexane, cyclohexane, methylcyclohexane, heptane, methylcycloheptane, octane, decane, benzene, toluene, ethylbenzene, p-xylene, m-xylene, o-xylene, n-propylbenzene, isopropylbenzene, n-butylbenzene, and mixtures thereof.

51. A process for the preparation of linear and multi-arm polymers of claim 35, wherein said liquid reaction media further comprises a polar solvent selected from the group consisting of aliphatic and cycloaliphatic ethers, aliphatic and cycloaliphatic tertiary amines, and mixtures thereof, wherein the proportion of polar to non-polar solvent is not greater than 1 to 5.

52. A process for the preparation of linear and multi-arm polymers of claim 51, wherein said aliphatic and cycloaliphatic ethers are selected from the group consisting of ethyl ether, dimethyl ether, methyl-tert-butyl ether, 1,2-dimethoxyethane, 1,2-diethoxyethane, dioxane, 2-methyltetrahydrofuran, tetrahydrofuran and mixtures thereof, and said aliphatic and cycloaliphatic tertiary amines are selected from the group consisting of triethylamine, trimethylamine, N-methylpiperidine, N-methylpyrrolidine, diazabicyclo|2.2.2|octane, $N,N,N^1,N^1$-tetramethylenediamine, and mixtures thereof.

53. Linear and multi-arm polymers possessing one free telechelically functional group and at least one protected telechelically functional group prepared by the process comprising polymerizing, one or more conjugated dienes or one or more alkenylaromatic compounds or mixtures thereof, in a liquid reaction medium, at a temperature of −30° C. to 150° C., for a period of at least one hour, with at least two protected functionalized initiators, each of which contains a differently protected hydroxyl, amino, alkylamino, or sulfhydryl group, having the formula

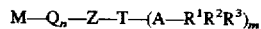

wherein M is an alkali metal; Q is an unsaturated hydrocarbyl group derived by incorporation of one or more conjugated diene hydrocarbons, one or more alkenylaromatic compounds, or mixtures of one or more dienes with one or more alkenylaromatic compounds into the M—Z linkage; Z is a branched or straight chain hydrocarbon connecting group which contains 3–25 carbon atoms; T is oxygen, sulfur, or nitrogen; $(AR^1R^2R^3)_m$ is a protecting group, in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, lower dialkylamino groups, or cycloalkyl and substituted cycloalkyl groups containing 5 to 12 carbon atoms; n is an integer from 0 to 5; and m is 1 when T is oxygen or sulfur, and 2 when T is nitrogen., to produce "living" polymer anions which are reacted with at least one compound selected from the group consisting of di- and polyfunctional linking agents to produce dissimilarly protected telechelically functionalized linear or multi-arm polymers, optionally hydrogenating the resulting polymers, and selectively removing one type of protective group on the dissimilarly protected functionalities on the end(s) of the arms of the linear or multi-arm polymer chains using selective reagents specifically suited to remove the more easily removable protective group, —A—$R^1R^2R^3$, and liberate the desired functionality, —T—$H_m$ on the end(s) of the polymer chains to produce linear or multi-arm polymers with unprotected hydroxyl, sulfhydryl, or amino groups on the ends of some of the arms of the polymer and protected hydroxyl, sulfhydryl, or amino groups on the end(s) of the other arm(s) of the linear or multi-arm polymers.

54. Linear and multi-arm polymers possessing one free telechelically functional group and at least one protected telechelically functional group of claim 53 prepared by the polymerizing process wherein the conjugated dienes are selected from the group consisting of butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene and mixtures of these.

55. Linear and multi-arm polymers possessing one free telechelically functional group and at least one protected telechelically functional group of claim 53 prepared by the process wherein the alkenylaromatic compound is selected from the group consisting of styrene, alpha-methylstyrene, vinyltoluene, 2-vinylpyridine, 4-vinylpyridine, 4-(tert-butyl)-styrene, 1-vinylnaphthalene, 2-vinylnaphthalene, 1-alpha-methylvinylnaphthalene, 2-alpha-methylvinylnaphathalene, 1,2-diphenyl-4-methylhexene-1, 3-methylstyrene, 3,5-diethylstyrene, 2-ethyl-4-benzylstyrene, 4-phenylstyrene, 4-p-tolylstyrene, 2,4-divinyltoluene and 4,5-dimethyl-1-vinylnaphthalene and mixtures of these.

56. Linear and multi-arm polymers possessing one free telechelically functional group and at least one protected telechelically functional group prepared by the process according to claim 53 wherein the polymerization of the conjugated diene(s), alkenylaromatic compound(s) or mixture(s) thereof with at least two protected functional initiators is carried out simultaneously in the same reaction vessel.

57. Linear and multi-arm polymers possessing one free telechelically functional group and at least one protected telechelically functional group of claim 53 wherein the polymerization of the conjugated diene(s), alkenylaromatic compound(s) or mixture(s) thereof with each protected functional initiator is carried out separately in two different vessels.

58. Linear and multi-arm polymers possessing one free telechelically functional group and at least one protected telechelically functional group of claim 53 wherein the conjugated diene(s), alkenylaromatic compound(s) or mixture(s) thereof in each of the two reaction vessels is different.

59. Linear and multi-arm polymers possessing one free telechelically functional group and at least one protected telechelically functional group of claim 53 wherein each component of the mixture of conjugated diene(s) and alkenylaromatic compound(s) is added sequentially to the polymerization vessel.

60. Linear and multi-arm polymers possessing one free telechelically functional group and at least one protected telechelically functional group of claim 53 wherein the protected functionalized initiators are selected from the group consisting of omega-(tert-alkoxy)-1-alkyllithiums, omega-(tert-alkoxy)-1-alkyllithiums chain extended with conjugated alkadienes or alkenyl aromatic compounds, omega-(tert-alkylthio)-1-alkyllithiums, omega-(tert-alkylthio)-1-alkyllithiums chain extended with conjugated alkadienes or alkenyl aromatic compounds, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes or alkenyl aromatic compounds, and omega-(bis-tert-alkylsilylamino)-1-alkyllithiums.

61. Linear and multi-arm polymers possessing one free telechelically functional group and at least one protected telechelically functional group of claim 53 wherein the protected functionalized initiators are selected from the group consisting of 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 3-(hexamethyleneimino)-2-methyl-1-propyllithium, 3-(hexamethyleneimino)-2,2-dimethyl-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium 6-(t-butyldimethylsilylthio)-1-hexyllithium, and 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium and their chain-extended analogues with isoprene, styrene or butadiene.

62. Linear and multi-arm polymers possessing one free telechelically functional group and at least one protected telechelically functional group of claim 53 wherein the linking agents are selected from the group consisting of di-, tri- and tetrahalosilanes, polyhalodisilanes, di- and trihaloalkylsilanes, polyhaloalkyldisilanes, di-, tri-, and tetrahalostannanes, di- and tri-haloalkylstannane, 1,2-divinylbenzene, 1,3-divinylbenzene, 1,4-divinylbenzene, 1,2,4-trivinylbenzene, 1,3-divinylnaphthalene, 1,8-divinylnaphthalene, 1,2-diisopropenylbenzene, 1,3-diisopropenylbenzene, 1,4-diisopropenylbenzene, and 1,3,5-trivinylnaphthalene.

63. Linear and multi-arm polymers possessing one free telechelically functional group and at least one protected telechelically functional group of claim 53 the more easily removable protective groups are selected from the group consisting of t-butyldimethylsilyl, trimethylsilyl, triethylsilyl, triisopropylsilyl, ethyldimethylsilyl, phenyldimethylsilyl, diphenylmethylsilyl, and di-t-butylmethylsilyl groups.

64. Linear and multi-arm polymers possessing one free telechelically functional group and at least one protected telechelically functional group of claim 53 wherein the selective reagents for removing the more easily removable protective group are selected from the group consisting of tetrabutylammonium fluoride, potassium fluoride and 18-crown-6, or pyridine-hydrofluoric acid complex, dilute hydrochloric acid, dilute phosphoric acid, and acetic acid.

65. The linear and multi-arm polymers possessing one free telechelically functional group and at least one protected telechelically functional group of claim 53, wherein M is lithium.

66. The linear and multi-arm polymers possessing one free telechelically functional group and at least one protected telechelically functional group of claim 53, wherein said liquid reaction media comprises a non-polar solvent selected from the group consisting of aliphatic, cycloaliphatic and aromatic hydrocarbons having 3 to 12 carbon atoms.

67. The linear and multi-arm polymers possessing one free telechelically functional group and at least one protected telechelically functional group of claim 66, wherein said non-polar solvent is selected from the group consisting of aliphatic, cycloaliphatic and aromatic hydrocarbons having 4 to 8 carbon atoms.

68. The linear and multi-arm polymers possessing one free telechelically functional group and at least one protected telechelically functional group of claim 66, wherein said non-polar solvent is selected from the group consisting of pentane, hexane, cyclohexane, methylcyclohexane, heptane, methylcycloheptane, octane, decane, benzene, toluene, ethylbenzene, p-xylene, m-xylene, o-xylene, n-propylbenzene, isopropylbenzene, n-butylbenzene, and mixtures thereof.

69. The linear and multi-arm polymers possessing one free telechelically functional group and at least one protected telechelically functional group of claim 53, wherein said liquid reaction media further comprises a polar solvent selected from the group consisting of aliphatic and cycloaliphatic ethers, aliphatic and cycloaliphatic tertiary amines, and mixtures thereof, wherein the proportion of polar to non-polar solvent is not greater than 1 to 5.

70. The linear and multi-arm polymers possessing one free telechelically functional group and at least one protected telechelically functional group of claim 69, wherein said aliphatic and cycloaliphatic ethers are selected from the group consisting of ethyl ether, dimethyl ether, methyl-tert-butyl ether, 1,2-dimethoxyethane, 1,2-diethoxyethane, dioxane, 2-methyltetrahydrofuran, tetrahydrofuran and mixtures thereof, and said aliphatic and cycloaliphatic tertiary amines are selected from the group consisting of triethylamine, trimethylamine, N-methylpiperidine, N-methylpyrrolidine, diazabicyclo[2.2.2]octane, N,N,N$^1$,N$^1$-tetramethylenediamine, and mixtures thereof.

71. A process for the preparation of polymers possessing dissimilarly protected telechelic functionalities, comprising:

polymerizing at least one monomer selected from the group consisting of conjugated dienes, alkenylsubstituted aromatic compounds, and mixtures thereof, with at least two dissimilarly protected functionalized initiators of the formula $$M-Q_n-Z-T-(AR^1R^2R^3)_m$$

wherein:

M is an alkali metal;

Q is an unsaturated hydrocarbyl group derived by incorporation of at least one compound selected from the group consisting of conjugated dienes, alkenylsubstituted aromatic compounds, and mixtures thereof;

n is an integer from 0 to 5;

z is a straight chain hydrocarbon connecting group which contains 3–25 carbon atoms;

T is oxygen; and $AR^1R^2R^3$ is a protecting group in which A is an element selected from Group IVa of the Periodic Table of Elements; and $R^1$, $R^2$, and $R^3$ are alkyl, with the proviso that one of the at least two dissimilarly protected functionalized initiators is a compound in which A is carbon and the other of the at least two dissimilarly protected functionalized initiators is a compound in which A is silicon, to produce living polymer anions; and reacting the living polymer anions with linking agents to produce dissimilarly protected telechelically functionalized polymers.

72. Polymers possessing dissimilarly protected telechelic functionalities prepared by the process comprising:

polymerizing at least one monomer selected from the group consisting of conjugated dienes, alkenylsubstituted aromatic compounds, and mixtures thereof, with at least two dissimilarly protected functionalized initiators of the formula $$M-Q_n-Z-T-(AR^1R^2R^3)$$

wherein:

M is an alkali metal;

Q is an unsaturated hydrocarbyl group derived by incorporation of at least one compound selected from the group consisting of conjugated dienes, alkenylsubstituted aromatic compounds, and mixtures thereof;

Z is a straight chain hydrocarbon connecting group which contains 3–25 carbon atoms;

T is oxygen;

$AR^1R^2R^3$ is a protecting group in which A is an element selected from Group IVa of the Periodic Table of Elements; and $R^1$, $R^2$, and $R^3$ are alkyl, with the proviso that one of the at least two dissimilarly protected functionalized initiators is a compound in which A is carbon and the other of the at least two dissimilarly protected functionalized initiators is a compound in which A is silicon, to produce living polymer anions; and reacting the living polymer anions with linking agents to produce dissimilarly protected telechelically functionalized polymers.

* * * * *